Patented Sept. 14, 1937

2,093,194

UNITED STATES PATENT OFFICE 2,093,194

GLASS, GLAZES, AND ENAMELS AND METHOD OF MAKING

Rudolf Geppert, Nuremberg-O., and Adolf Dietzel, Berlin-Zehlendorf, Germany, assignors to Deutsche Tafelglas Aktiengesellschaft (Detag), Nurnberger, Furth, Bavaria No Drawing. Application November 1, 1935, Serial No. 47,904. In Germany November 5, 1934

9 Claims. (Cl. 106—36.1)

The invention relates to the improvement of glass, glazes and enamels with respect to their resistance to chemical influences, particularly to water, acids, alkalies and salt solutions. The destruction of the said substances (glass, glazes, enamels), which may lead to opacity, the formation of rough surfaces, iridescent spots and the like phenomena is limited by the process according to the invention in the degree desired in each particular case.

Heretofore, it was well known that gases are capable of diffusing into silicate melts at a high temperature, but nothing was known regarding the effect of these gases on the chemical resistivity of the goods made from the molten masses. There is in existence merely a thesis regarding the supposed diffusion of carbon dioxide in glass and its favourable effect on the chemical resistivity of the glass. It has been found, however, that by supplying carbon dioxide to a molten mass of glass, the chemical resistivity of the glass is not affected. The same failure was encountered when sulphur dioxide and sulphuric acid were introduced into the molten glass.

Processes for the improvement of glass are also known which merely alter the surface of the glass by the effect of cooling gases during the cooling process. This relates to the effect of carbon dioxide and sulphur dioxide. Such improvement, however, only extends over a thin surface layer of the glass and this layer is very soon destroyed when attacked by water or chemicals during use, thus exposing the remaining untreated glass. Visible decomposition or destruction is thereby merely delayed, but is not prevented. In addition, in the case for example of glass which is ground, frosted, etched and the like, the improved surface layer is removed in any case, since such treatments are only carried out after cooling.

The problem was to discover a process in which the improvement of glass, glazes and enamels with respect to their resistance to chemical influences is not restricted merely to the surface but extends throughout the entire mass. A further object was to increase the improvement as compared with the process known heretofore and to enable it to be adapted gradually to the practical purpose intended in each case.

In order to achieve the prescribed object, water vapour or substances which evolve water vapour are introduced into the glass, glazes or enamels while the latter are in the molten state.

This is effected for example by producing above the molten mass an atmosphere containing water vapour, or by introducing substances which evolve water vapour into the molten masses or into the mixture of raw materials. In the latter case, care must be taken to prevent the water vapour absorbed by the molten mass from diffusing out during the subsequent manufacturing process, for example by maintaining above the molten mass an atmosphere which contains water vapour.

In the case of glazes and enamels, water vapour or substances which evolve water vapour may be supplied, in accordance with their different treatment, either in making the frits or during the firing operation, or in both stages of manufacture.

The degree of improvement depends upon the water vapour content of the molten masses and may be regulated according to the intended purpose, for example by the adjustment of the partial pressure of water vapour in or above the molten mass, or by the quantity and duration of action of the substances which evolve the water vapour.

The improvement of a glass, glaze or enamel i. e. the improvement of its chemical resistivity, attainable according to the invention, is very considerable. Glass for example of the composition of commercial drawn sheet glass lies about the boundary of the 4th and 3rd hydrolytic classes with respect to its chemical resistivity. By incorporating about 0.35% of water into the same composition of glass, the chemical resistivity increases to that of the first hydrolytic class.

It is known per se to inject water vapour through molten glass or to evolve water vapour in molten glass by the introduction of water-containing substances. Heretofore, however, this has only been done for the purpose of agitating the glass and rendering it homogeneous, but not in such a manner that considerable quantities of water vapour could have been incorporated with the glass. The duration of the passage of the water vapour until the molten mass has been rendered uniform is much too short for the incorporation of considerable quantities of water. Since furthermore no precautions were made to retain the incorporated water in the molten mass, for example by maintaining above the molten mass an atmosphere rich in water vapour, this known passage of water vapour could never give better glass than ordinary commercial glass with 13–14% or more alkali, i. e.

with a water-content of about 0.07% and a stability lying around the boundary of the third and fourth hydrolytic classes, since according to the inventors' experience, the stability rises or falls with the water content.

We claim:—

1. In a process for the manufacture of glass, glazes or enamels of improved chemical resistivity, the steps of acting on the glass, glaze or enamel with water vapor while they are in the molten state until increased quantities of water are incorporated in the molten mass, and preventing the escape of the incorporated quantities of water.

2. In a process for the manufacture of glass, glazes or enamels of improved chemical resistivity the step which comprises maintaining above the glass, glaze or enamel, while in the molten state, an atmosphere of a water vapor content adapted to cause the incorporation of increased quantities of water in the molten mass, and to prevent the escape of the incorporated quantities of water.

3. In a process for the manufacture of glass, glazes or enamels of improved chemical resistivity, the steps of introducing into the glass, glaze or enamel, while in the molten state, a substance which evolves water vapor until increased quantities of water are incorporated in the molten mass, and preventing the escape of the incorporated quantities of water.

4. In a process for the manufacture of glass, glazes or enamels of improved chemical resistivity, the steps of introducing into the glass, glaze or enamel, while in the molten state, water vapor through pipes or passages until increased quantities of water are incorporated in the molten mass, and preventing the escape of the incorporated quantities of water.

5. As new commercial products glass, glazes and enamels having a water content between .07% and .35%, produced by the incorporation of water vapor therein while in the molten state and by preventing the escape of the incorporated quantities of water, and thereby having an increased chemical resistivity.

6. As a new product, commercial glass having incorporated therein of from above 0.07% to about 0.35% of water and thereby having an increased chemical resistivity.

7. As a new product, commercial drawn sheet glass having a chemical resistivity of the first hydrolytic class and having a water content of approximately .35%.

8. In a process for the manufacture of glass, glazes or enamels of improved chemical resistivity, the steps of introducing a substance which evolves water vapor into the glass, glaze or enamel, which is in the form of a molten mass having an exposed surface, until increased quantities of water are incorporated in the molten mass, and maintaining above the exposed surface of the molten mass an atmosphere having a water vapor content suitable to prevent the escape of the incorporated quantities of water.

9. In a process for the manufacture of glass, glazes or enamels of improved chemical resistivity, the steps of introducing water vapor into the glass, the glaze or the enamel which forms a molten mass having an exposed surface, through pipes or passages until increased quantities of water are incorporated in the molten mass and maintaining above the exposed surface of the molten mass an atmosphere having a water vapor content suitable to prevent the escape of the incorporated quantities of water.

ADOLF DIETZEL.
RUDOLF GEPPERT.